(12) United States Patent
Milazzo

(10) Patent No.: US 10,450,429 B2
(45) Date of Patent: Oct. 22, 2019

(54) COMPOSITE MATERIALS COMPRISING AT LEAST ONE THERMOPLASTIC RESIN AND GRANULAR SHIVE FROM HEMP AND/OR FLAX

(71) Applicant: MICA S.r.l., Ragusa (IT)

(72) Inventor: Giovanni Milazzo, Paterno (IT)

(73) Assignee: MICA S.r.l. (IT)

( * ) Notice: Subject to any disclaimer, the term of this patent is extended or adjusted under 35 U.S.C. 154(b) by 0 days.

(21) Appl. No.: 15/562,717

(22) PCT Filed: Apr. 1, 2016

(86) PCT No.: PCT/IB2016/051882
§ 371 (c)(1),
(2) Date: Sep. 28, 2017

(87) PCT Pub. No.: WO2016/157151
PCT Pub. Date: Oct. 6, 2016

(65) Prior Publication Data
US 2018/0118902 A1 May 3, 2018

(30) Foreign Application Priority Data

Apr. 3, 2015 (IT) .................. 102015000010935

(51) Int. Cl.
| | |
|---|---|
| *C08J 5/04* | (2006.01) |
| *C08J 11/00* | (2006.01) |
| *C08L 3/04* | (2006.01) |
| *C08L 55/02* | (2006.01) |
| *C08L 67/02* | (2006.01) |
| *C08L 67/04* | (2006.01) |
| *C08L 97/02* | (2006.01) |
| *B33Y 70/00* | (2015.01) |
| *B29C 64/106* | (2017.01) |
| *B29C 64/118* | (2017.01) |
| *B29K 23/00* | (2006.01) |
| *B29K 67/00* | (2006.01) |
| *B29K 105/16* | (2006.01) |
| *B29K 511/10* | (2006.01) |

(52) U.S. Cl.
CPC ............. *C08J 5/045* (2013.01); *B33Y 70/00* (2014.12); *C08J 5/047* (2013.01); *C08J 11/00* (2013.01); *C08L 3/04* (2013.01); *C08L 55/02* (2013.01); *C08L 67/02* (2013.01); *C08L 67/04* (2013.01); *C08L 97/02* (2013.01); *B29C 64/106* (2017.08); *B29C 64/118* (2017.08); *B29K 2023/12* (2013.01); *B29K 2067/046* (2013.01); *B29K 2105/16* (2013.01); *B29K 2511/10* (2013.01); *C08J 2323/12* (2013.01); *C08J 2367/04* (2013.01); *C08L 2205/14* (2013.01)

(58) Field of Classification Search
CPC . B33Y 70/00; C08J 5/045; C08J 5/047; C08J 11/00; C08L 3/04; C08L 55/02; C08L 67/02; C08L 97/02
See application file for complete search history.

(56) References Cited

U.S. PATENT DOCUMENTS 6,133,348 A    10/2000 Kolla et al.

FOREIGN PATENT DOCUMENTS

| EP | 1939253 A1 | 7/2008 |
| GB | 2509757 A | 7/2014 |
| WO | 00/05294 A1 | 2/2000 |

OTHER PUBLICATIONS

International Search Report and Written Opinion dated Jul. 5, 2016, in corresponding International Application No. PCT/IB2016/051882, 14 pages.
Merkel, K. et al., "Processing and characterization of reinforced polyethylene composites made with lignocellulosic fibres isolated from waste plant biomass such as hemp", Composites Part B: Engineering, vol. 67, Jun. 22, 2014, pp. 138-144.
Bakradze G. et al., "Correlation between the mechanical properties and the amount of desorbed water for composites based on a recycled low-density polyethylene and linen yarn production waste", Mechanics of Composite Materials, vol. 43, No. 5, Sep. 1, 2007, pp. 427-432.
Etaati, A. et al., "The study of fibre/matrix bond strength in short hemp polypropylene composites from dynamic mechanical analysis", Composites: Part B, vol. 62, Feb. 25, 2014, pp. 19-28.
Toensmeier, P., "Carnevalli Diversifies lines in bid for Market Growth", Modern Plastics International, vol. 29, No. 2, Feb. 1, 1999, pp. 30-32.

*Primary Examiner* — Edward J Cain

(74) *Attorney, Agent, or Firm* — MH2 Technology Law Group LLP

(57) ABSTRACT

A composite material may include at least one thermoplastic resin; and from 5 to 180 parts by weight of granular shive from hemp and/or flax, with respect to 100 parts by weight of the at least one thermoplastic resin, with particles having an average particle size lower than 0.2 millimeters (mm). A method for the manufacture of a composite material may include: melting the at least one thermoplastic resin; mixing the at least one molten resin with from 5 to 180 parts by weight, with respect to 100 parts by weight of the at least one thermoplastic resin, of granular shive from hemp and/or flax with an average particle size lower than 0.2 mm; and cooling the mixture obtained in order to form the composite material.

20 Claims, 4 Drawing Sheets

COMPOSITE MATERIALS COMPRISING AT LEAST ONE THERMOPLASTIC RESIN AND GRANULAR SHIVE FROM HEMP AND/OR FLAX

CROSS-REFERENCE TO RELATED APPLICATION(S)

This application is a national stage entry from International Application No. PCT/IB2016/051882, filed on Apr. 1, 2016, in the Receiving Office ("RO/IB") of the International Bureau of the World Intellectual Property Organization ("WIPO"), published as International Publication No. WO 2016/157151 A1 on Oct. 6, 2016, and claims priority under 35 U.S.C. § 119 from Italian Patent Application No. 102015000010935, filed on Apr. 3, 2015, in the Italian Patent and Trademark Office ("IPTO"), the entire contents of all of which are incorporated herein by reference.

The present invention relates to a composite material comprising at least one thermoplastic resin and granular skive from hemp and/or flax.

The invention further relates to a method for preparing the above-mentioned composite material and the use of the latter in the 3D printing technologies, namely the manufacture of three-dimensional objects by additive manufacturing, starting from a digital 3D model.

The composite materials are obtained thanks to the combination of two or more materials different from each other and they are widely used thanks to their enhanced physical-mechanical properties, among which higher resistance and long-duration with respect to those of the single starting materials.

Various composite materials comprising matrices of thermoplastic resins and components of natural origin, in particular natural fibers derived from Kenaf, hemp, flax, jute, henequen, leafs of pineapple, sisal, wood and sawdust are currently known. The possibility to recycle the processing scraps of such components of natural origin raises particular interest.

Generally, the spread of the processing of hemp or flax and the resulting production of waste products shifted the interest on the recycle of the waste by-products obtained.

The products obtained from the processing of the hemp or flax plant are the long fibers (used in the textile industry), the bast fibers or bast (from which the cellulose is obtained) and the ligneous stems or shive.

These latter two products, which compose the inner core of the long fibers which are removed, can be obtained by the process of scutching, through which the ligneous core of the stems, after maceration, is broken, so as to obtain the separation of bast from shive.

The Applicant considered how to provide a composite material having enhanced physical-mechanical properties and more lightness, starting from waste material from hemp or flax processing and which, at the same time, has an enhanced workability and is cheaper.

The Applicant was able to obtain such results by using, into a composite material, a component having a fine particle size derived from waste of hemp or flax processing, to date used as fertilizer, as fuel pellet, in the field of green-building, together with lime and as animal litter.

Particularly, the Applicant found that the above-mentioned problem is solved through a composite material comprising a thermoplastic resin and shive from hemp and/or flax with fine particle size, wherein resin and shive are present in a certain ratio by weight.

Therefore, according to a first aspect, the present invention relates to a composite material comprising at least one thermoplastic resin and from 5 to 180 parts by weight of granular shive from hemp and/or flax, with respect to 100 parts by weight of the thermoplastic resin, with particles having an average particle size lower than 0.2 mm, preferably lower than 0.1 mm.

Advantageously, the composite material according to the present invention has an enhanced workability, as the granular shive from hemp and/or flax with particle size lower than 0.2 mm, preferably 0.1 mm, disperses in a more homogenous manner with the thermoplastic resin, both with respect to other components derived from hemp with a higher particle size, and with respect to other materials with a particle size lower than 0.2 mm, for example sawdust.

Another advantage related to the particle size characterizing the shive according to the invention is to allow the use of high amounts of shive with respect to the amount of resin, determining both a higher lightness of the resultant material and an economical advantage, as it allows to decrease the amount of resin used in the composite material, without adversely affecting the thermoplastic properties of the composite material obtained. Furthermore, the shive used in the present invention represents a waste material of the hemp and/or flax processing, and therefore its reuse does not involve additional costs, indeed it represents a manner for using such waste product.

Furthermore, the addition of shive according to the present invention allows to obtain a composite material with enhanced processability in the molten state with respect to, for example, the addition of short hemp fibers, which tend to increase the viscosity of the melted and to create obstructions when the material is processed by the passage through nozzles with a very small particle size, for example lower than 2 mm or also lower than 0.4 mm. That makes the material according to the invention particularly suitable for the manufacture of three-dimensional objects by 3D printing, which requires the use of nozzles of those sizes.

Further features and advantages of the present invention will be evident from the following detailed description.

In the present description and attached claims, the wording "granular shive from hemp and/or flax with particles having an average particle size lower than 0.2 mm, preferably lower than 0.1 mm" (also called "fine shive" o "shive") means a fine powder obtained from the processing of the large shive, for example by grinding. The fine shive can also derive from the suction of powders which disperse during the processing of hemp straws. Similarly, in the present description, the term "large shive" (which generally has a particle size of 1-2 cm) means the shive obtained by separation (for example by scutching) of the shive itself (also known as "woody stem") from the bast fiber (also called "bast").

Particularly, the granular shive from hemp and/or flax in general has substantially spherically-shaped particles, which is not to be confused with the so called short hemp fibers which are characterized by a fibrillary structure. Such structural difference can be appreciate, for example, by optical microscope observation or, preferably, by scanning electron microscope (SEM) observation.

Preferably, the particles of shive have an average particle size from 5 μm to 300 μm, more preferably from 10 μm to 100 μm. The average particle size can be determined according to the known techniques. Particularly, for average sizes such as those indicated above, the laser diffraction technique, according to the standard ISO 13320-1 (1999), is generally used. As for higher sizes (up to 0.2 mm) techniques based on the analysis of images obtained by microscope can be used.

A parameter which can be used for characterizing particles of shive is the aspect ratio, namely the ratio between the higher diameter and the smaller diameter, perpendicular to the higher diameter, determined on a projection onto the plane of each particle (Feret diameter). Such parameter can be determined through the analysis of images obtained by the microscope, as described in the standard ISO 9276-6 (2008).

According to a preferred embodiment of the present invention, the shive has an aspect ratio from 0.5 to 2.0, preferably from 0.8 to 1.2, even more preferably from 0.9 to 1.1.

According to another preferred embodiment the composite material according to the present invention further comprises from 0.1 to 60 parts by weight of bast fibers (bast) from hemp and/or flax having a length from 0.5 cm to 4 cm, preferably from 0.6 cm to 2 cm.

According to another preferred embodiment, the used thermoplastic resin can be of natural or synthetic origin. When the thermoplastic resin is of synthetic origin, it is preferably selected from polyethylene terephthalate (PET), polypropylene (PP), polyethylene (PE), acrylonitrile-butadiene-styrene (ABS) copolymer, polypropylene/polyethylene terephthalate copolymer, ethylene-propylene copolymer. When the thermoplastic resin is of natural origin, it is preferably selected from polylactic acid (PLA), polyhydroxyalkanoates (PHA), modified starches (such as, for example, those known under the commercial name "Mater B") or polyethylene from bioethanol (known under the commercial name "BIO PET 30"), more preferably PLA, which are characterized by high biodegradability.

Preferably the composite material according to the invention further comprises a particle-shaped component having an average particle size lower than 0.2 mm, preferably lower than 0.1 mm, for example a component derived from coconut shell, namely the hard shell of coconut (brownish covering), to which the meat (pulp) adheres and which needs to be broken in order to reach the meat itself. Such component is preferably obtained by breaking operations of the hard shell of coconut, which are carried out in order to take the pulp. Furthermore, such component can derive by grinding coconut shell residues.

According to a preferred embodiment of the invention, the composite material further comprises a binding agent, which allows to improve the mechanical properties of the material itself. It is believed that such binding effect is obtained thanks to the capability of the binding agent of binding the silicates present in the skive. Preferably the binding agent is selected from selected from alkali metal oxides and/or alkaline-earth metal oxides, preferably calcium oxide.

According to a second aspect, the present invention relates to a method for the manufacture of the composite material as defined above comprising the steps of:
- melting at least one thermoplastic resin;
- mixing said at least one molten resin with from 5 to 180 parts by weight, with respect to 100 parts by weight of the thermoplastic resin, of granular skive from hemp or flax with particles having an average particle size lower than 0.2 mm, preferably lower than 0.1 mm;
- cooling the mixture obtained in order to form said composite material.

According to a third aspect, the present invention relates to the use of the composite material as defined above for the manufacture of three-dimensional objects by 3D printing. As known, the 3D printing is an additive manufacturing of three-dimensional objects, starting from a digital 3D model. One of the most widespread techniques is the so-called "fused deposition modeling" (FDM), which provide the overlapping of thin layers of thermoplastic material in the molten state obtained starting from filaments which are directed to an application head where the filament is melted and placed on a platform by nozzles, thus forming subsequent layers according to the 3D model provided. The composite material according to the invention is in the filament form, for example filament coils or rolls, which are directed to the application head of the 3D printer. The use of the composite material according to the invention in the field of the 3D printing advantageously allows to avoid the formation of obstructions in the application nozzles, which instead are often formed when composite materials containing a fibrous component are used, for example hemp fibers, which have a marked tendency to adhere to the nozzles walls, thus impeding the material deposition.

The present invention has been described for illustrative but not limitative purposes, according to its preferred embodiments, but it is to be understood that modifications and/or changes can be introduced by the persons skilled in the art without departing from the relevant scope of protection as defined in the enclosed claims.

BRIEF DESCRIPTION OF THE DRAWING

The present invention will be now described, for illustrative, but not limitative purposes, according to its preferred embodiments, with particular reference to the figures of the enclosed drawings, wherein.

Figure 1:
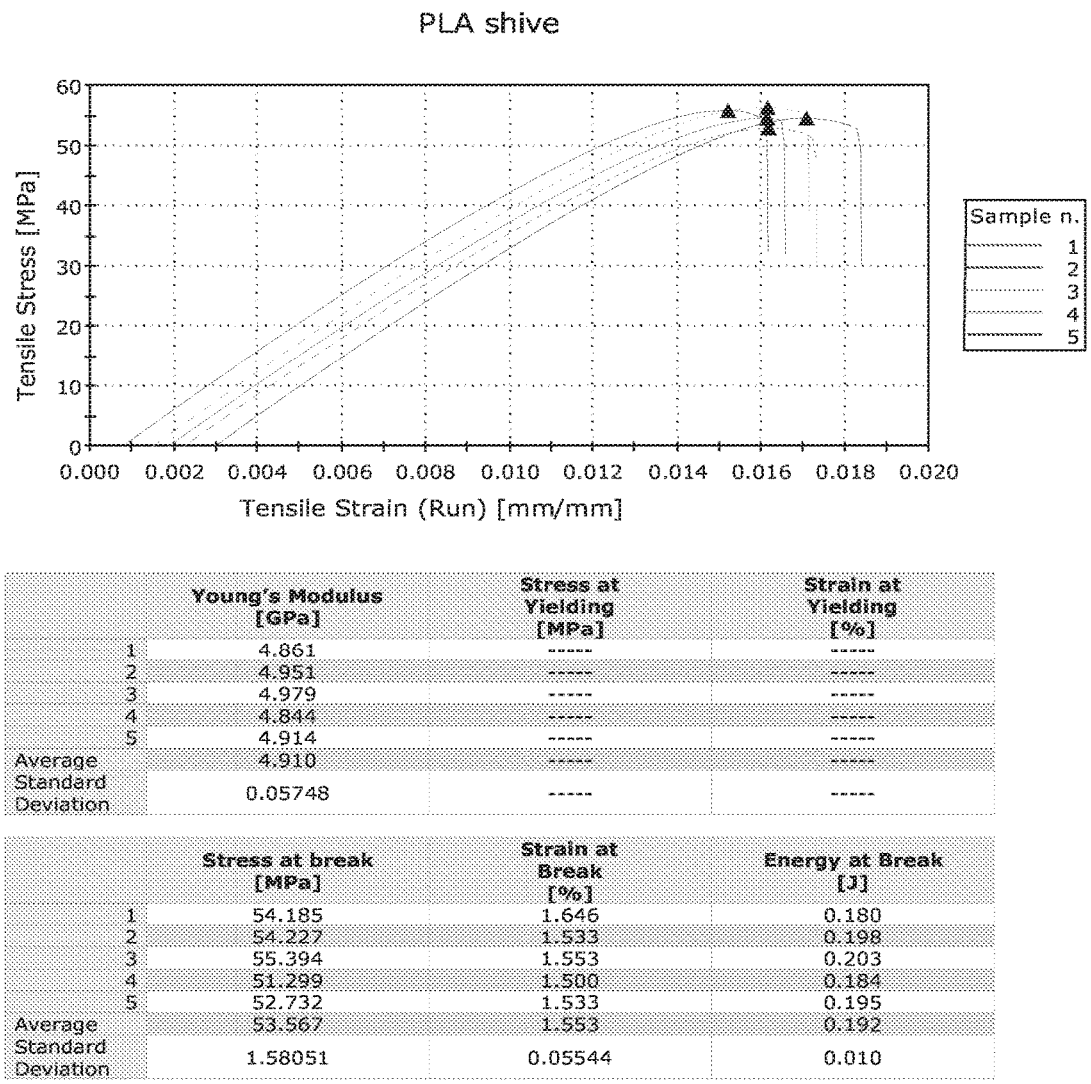
FIG. 1 shows the results of the tensile tests carried out on the composite material according to the invention.

The present invention will now be further illustrated by certain example of embodiments as reported below.

EXAMPLE 1

The composite material according to the invention was prepared by placing into a vessel made of aluminum about 2 g of PLA (equal to about twenty granules of PLA) and then heated on a plate to a temperature of 300° C. in order to obtain the PLA melting. Then, about 1 g of shive constituted by particles having an average particle size lower than 0.1 mm was added, namely equal to about 40% by weight with respect to the total weight of the composite material obtained and then the whole was homogenized by mixing for at least 5 minutes, decreasing the plate temperature. The composite material obtained had good workability and it was placed on an aluminum foil and a sample in the plate-form having a thickness equal to about 3 mm was obtained by pressing, which was left to cool up to hardening. The sample was subjected to several tests in order to test the physical-mechanical properties of the sample itself. The results showed that the material tested is rigid, hard and it has properties of flexural, tensile and impact strength, equal to or higher than the thermoplastic resin alone. Furthermore, once hardened, the sample was subjected to conditions of water washout mechanical stress keeping intact its properties, without undergoing degradation.

EXAMPLE 2

A further test was carried out starting from the sample obtained in the example 1 in order to verify the possibility to rework the thermoplastic resin already produced with shive so as to reuse it without causing the separation between the phases.

Particularly, the sample obtained in the preceding example was melted into a 100 ml beaker on a heating plate, at a temperature of 300° C. (mixture 1). In order to avoid the degradation of the thermoplastic polymer, the material was subjected to stirring. Simultaneously, 2 g of PLA were melted on a heating plate into a 100 ml beaker, and then shive 1 g was gradually added. At the same time of any shive addition, the whole was mixed. After having obtained an homogeneous mixture (mixture 2), the latter was combined with mixture 1 and the whole was mixed, maintaining the plate temperature at 300° C. The obtained composite material had good workability and it was placed on an aluminum foil and a sample in the plate-form having a thickness of 2-3 mm was obtained by pressing, which was left to cool up to hardening. The sample was subjected to several tests in order to test the physical-mechanical properties of the sample itself. The results showed that the material tested has surprising hardness, tensile, flexural mechanical properties and it has good properties of resilience in addition to a low weight.

EXAMPLE 3

A test, in which polypropylene (PP) was used as thermoplastic resin, was carried out. 2 g of PP were placed into a 100 ml beaker and melted on a heating plate at 300° C. Simultaneously, about 1 g of shive, with an average particle size lower than 0.1 mm, was weighted in a crucible. After having achieved the temperature of 100° C., namely when PP was almost completely melted, the shive was gradually added. The sample was subjected to several tests in order to test the physical-mechanical properties of the sample itself, particularly the obtained material was subjected to water flow (for 10 min), showing a great resistance to water. Furthermore, such material showed an excellent tensile strength.

EXAMPLE 4 (COMPARISON)

The examples 1-3 were repeated using sawdust in place of shive, wherein said sawdust had a particle size comparable to the particle size of the shive used in examples 1-3, namely a particle size lower than 0.1 mm, wherein the sawdust was present in an amount of 50% by weight of the total composition with respect to the resin. As in the preceding examples, the obtained material was subjected to several tests in order to test the physical-mechanical properties thereof. The results showed that the tested material has worse workability than the materials obtained in the examples 1-3.

EXAMPLE 5

Tensile tests were carried out on the composite material of the invention obtained in the example 1 in order to determine certain mechanical characteristics. The properties considered and the results are reported in FIG. 1.

EXAMPLE 6

Figure 2:
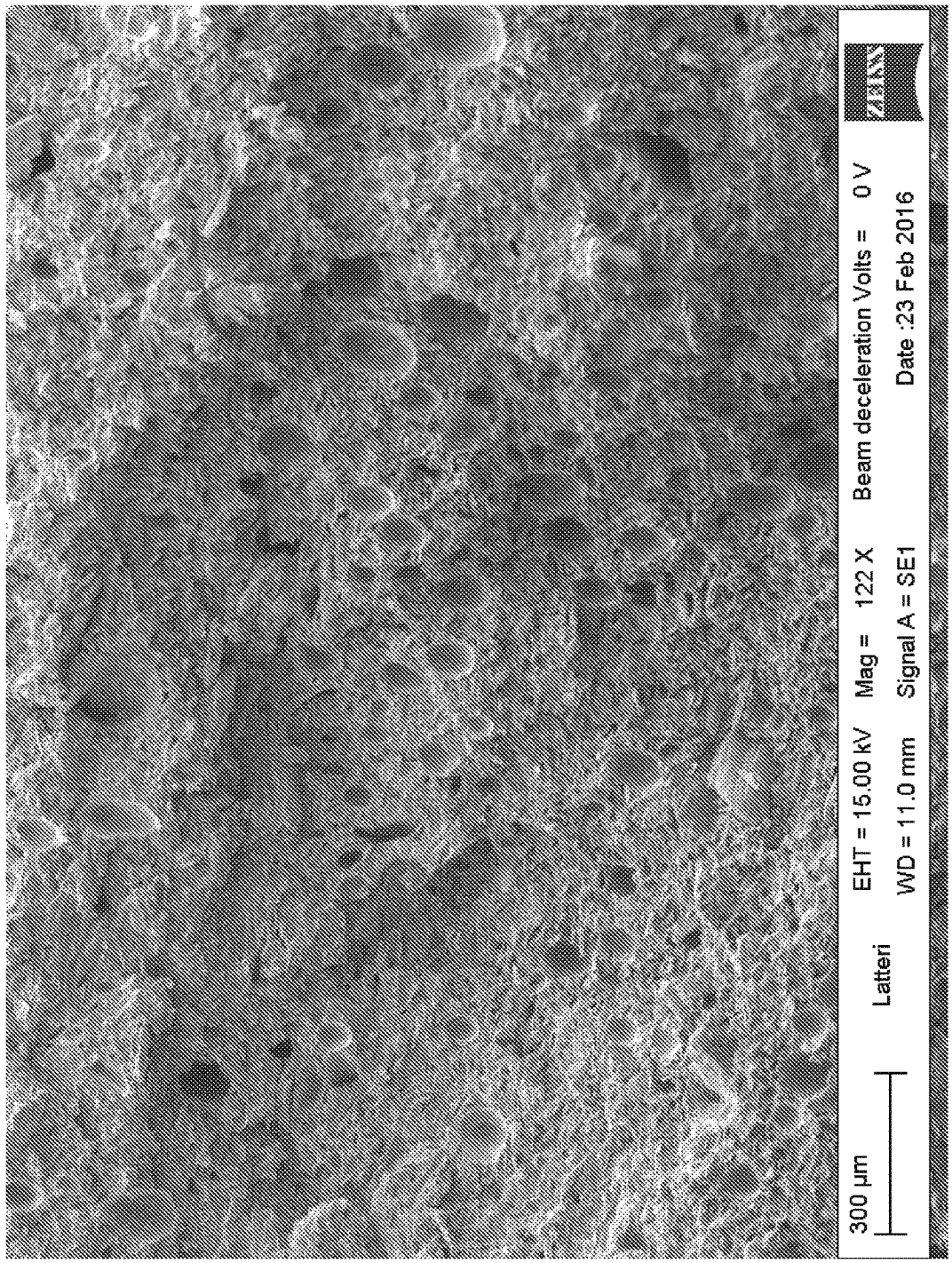
FIG. 2 shows the SEM image related to the composite material according to the invention.

Scanning electron microscope (SEM) analyses were carried out in order to structurally characterize shive from hemp. The shive considered was in powdery and volatile form and, for this reason, it was not possible to carry out a direct analysis through electronic microscopy as the SEM device requires high vacuum to be applied within the chamber containing the sample, which is evidently incompatible with a sample of that type. Therefore, in order to overcome such problem, the analysis was carried out on the composite material of the present invention containing PLA as thermoplastic resin and shive as filler, in correspondence of the fracture areas of the material itself. Mixtures of PLA and shive were made in several ratios from each other, in particular 5, 10, 15, 20 and 25 parts by weight of shive respectively, with respect to 100 parts by weight of PLA, wherein the shive has an average particle size of about 50 µm. For this purpose a Brabender Plastograph mixer was used at a temperature of 170° C. for 10 minutes. Samples of material thus obtained were fractured and analyzed by scanning electron microscope SEM. As showed in FIG. 2, the microscope analysis highlighted as the samples containing shive have cavities attributable to the granular particles of shive which were extracted from the matrix after the fracture.

From the microscope analysis it is evident as the nature of the shive is of the granular type.

EXAMPLE 7 (COMPARISON)

Figure 3:
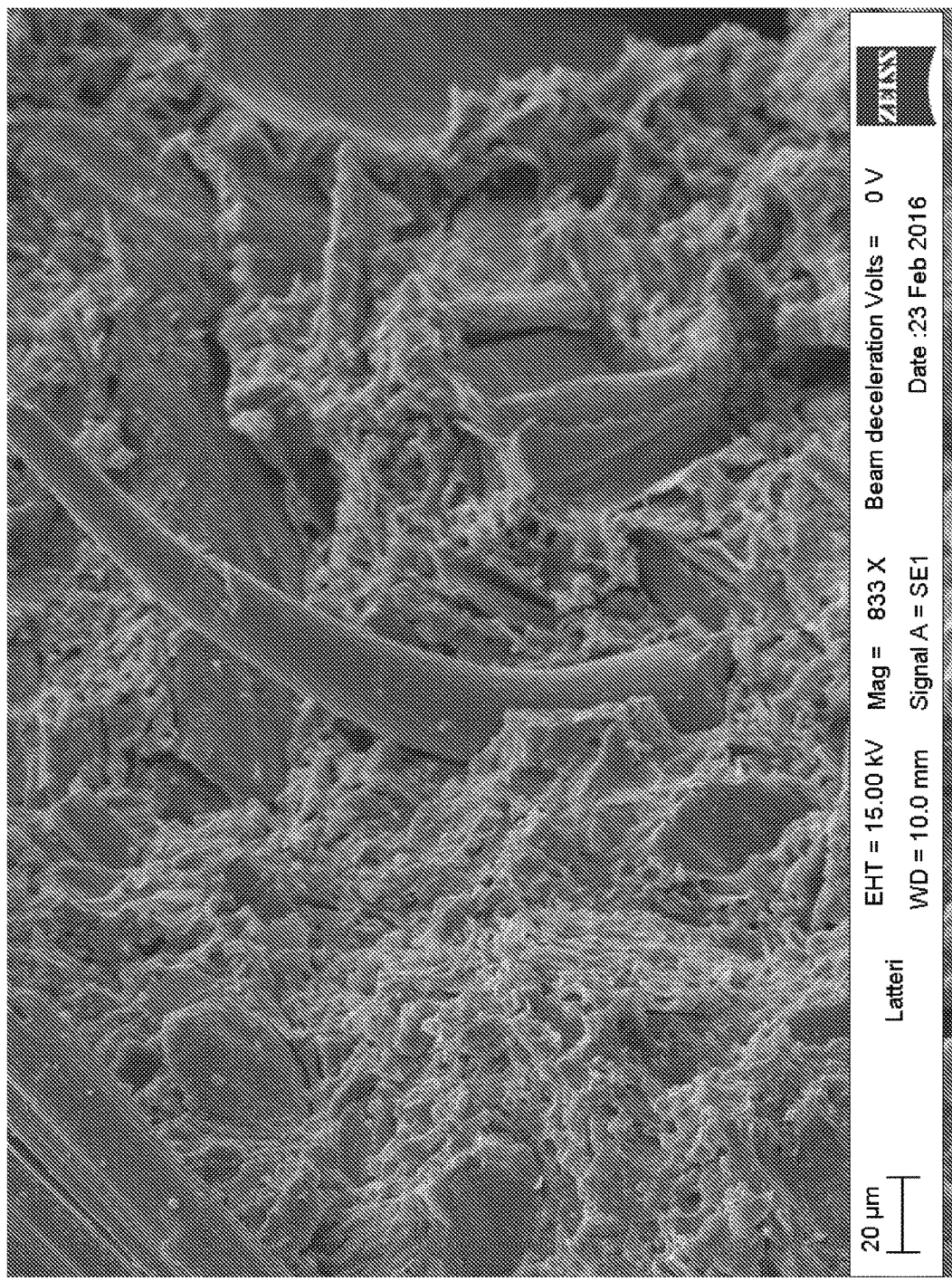
FIGS. 3 and 4 show the SEM images related to the composite material containing hemp fibers in place of granular skive.
Figure 4:
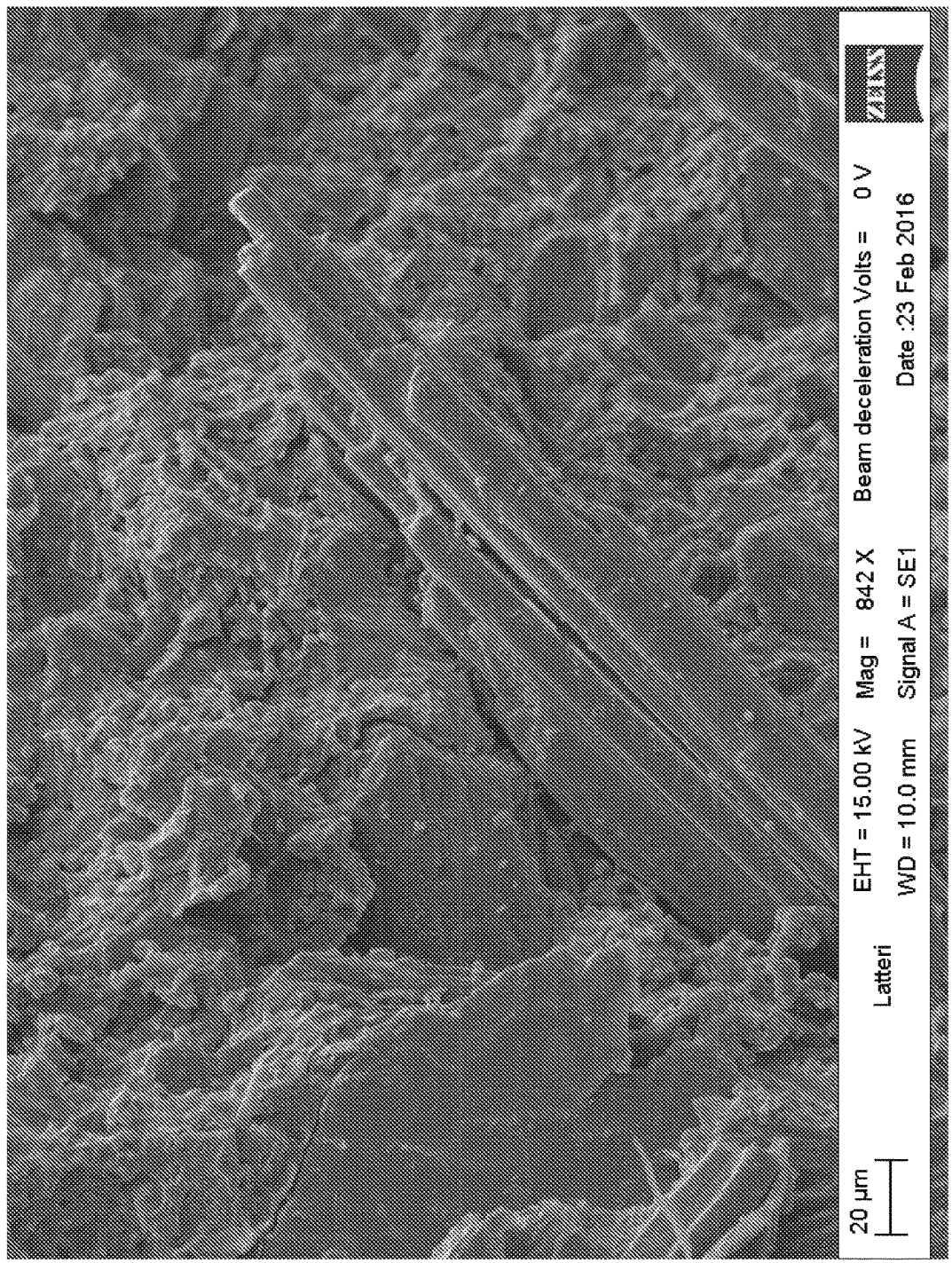

The example 5 was repeated using, in the place of shive, hemp fibers having an average length of 2 mm and the scanning electron microscope (SEM) analysis highlighted (see FIGS. 3 and 4) the presence of fibrillar structures only and the absence of cavities in the samples of material obtained. Furthermore, the fibrillar structures have poor adhesion with respect to the matrix of thermoplastic resin.

The invention claimed is:

1. A composite material, comprising:
   at least one thermoplastic resin; and
   from 5 parts by weight to 180 parts by weight of granular shive from hemp and/or flax, with respect to 100 parts by weight of the at least one thermoplastic resin, with particles of the shive having an average particle size lower than 0.2 millimeters (mm);
   wherein the particles of the shive have an aspect ratio from 0.8 to 1.2.

2. The composite material of claim 1, wherein the average particle size is lower than 0.1 mm.

3. The composite material of claim 1, further comprising;
   from 0.1 parts by weight to 60 parts by weight of bast fibers from hemp and/or flax having a length from 0.5 centimeters (cm) to 4 cm.

4. The composite material of claim 1, wherein the at least one thermoplastic resin is of natural or synthetic origin.

5. The composite material of claim 4, wherein the at least one thermoplastic resin of synthetic origin is selected from polyethylene terephthalate (PET), polypropylene (PP), polyethylene (PE), acrylonitrile-butadiene-styrene (ABS) copolymer, polypropylene/polyethylene terephthalate copolymer, or ethylene-propylene copolymer.

6. The composite material of claim 4, wherein the at least one thermoplastic resin of natural origin is selected from polylactic acid (PLA), polyhydroxyalkanoates (PHA), modified starches, or polyethylene from bioethanol.

7. The composite material of claim 1, further comprising:
   a component, with an average particle size lower than 0.2 mm, derived from coconut shell.

8. The composite material of claim 1, further comprising:
   a binding agent selected from alkali metal oxides and/or alkaline-earth metal oxides.

9. A method for manufacturing a composite material comprising at least one thermoplastic resin, and from 5 parts by weight to 180 parts by weight of granular shive from hemp and/or flax, with respect to 100 parts by weight of the at least one thermoplastic resin, with particles of the shive having an average particle size lower than 0.2 millimeters (mm), the method comprising:
   melting the at least one thermoplastic resin;
   mixing the melted at least one thermoplastic resin with the from 5 parts by weight to 180 parts by weight, with respect to the 100 parts by weight of the at least one thermoplastic resin, of the granular shive from hemp and/or flax with the average particle size lower than 0.2 mm; and
   cooling the mixture obtained in order to form the composite material; and
   wherein the particles of the shive have an aspect ratio from 0.8 to 1.2.

10. A method for manufacturing a three-dimensional (3D) object using fused deposition modeling, the method comprising:
   providing a filament of composite material;
   directing the filament to an application head, where the filament is melted and placed on a platform by nozzles; and
   forming subsequent layers of the 3D object according to a 3D model of the 3D object;
   wherein the composite material comprises:
      at least one thermoplastic resin; and
      from 5 parts by weight to 180 parts by weight of granular shive from hemp and/or flax, with respect to 100 parts by weight of the at least one thermoplastic resin, with particles of the shive having an average particle size lower than 0.2 millimeters (mm); and
   wherein the particles of the shive have an aspect ratio from 0.8 to 1.2.

11. The composite material of claim 1, wherein the aspect ratio is from 0.9 to 1.1.

12. The composite material of claim 1, further comprising:
   from 0.1 parts by weight to 60 parts by weight of bast fibers from hemp and/or flax having a length from 0.6 centimeters (cm) to 2 cm.

13. The composite material of claim 4, wherein the at least one thermoplastic resin of natural origin comprises polylactic acid (PLA).

14. The composite material of claim 1, further comprising:
   calcium oxide.

15. The composite material of claim 1, further comprising:
   a component, with an average particle size lower than 0.1 mm, derived from coconut shell.

16. The method of claim 10, wherein the composite material further comprises from 0.1 parts by weight to 60 parts by weight of bast fibers from hemp and/or flax having a length from 0.5 centimeters (cm) to 4 cm.

17. The method of claim 10, wherein the at least one thermoplastic resin is of natural or synthetic origin.

18. The method of claim 17, wherein the at least one thermoplastic resin of synthetic origin comprises one or more of polyethylene terephthalate (PET), polypropylene (PP), polyethylene (PE), acrylonitrile-butadiene-styrene (ABS) copolymer, polypropylene/polyethylene terephthalate copolymer, or ethylene-propylene copolymer.

19. The method of claim 17, wherein the at least one thermoplastic resin of natural origin comprises one or more of polylactic acid (PLA), polyhydroxyalkanoates (PHA), modified starches, or polyethylene from bioethanol.

20. The method of claim 17, wherein the at least one thermoplastic resin of natural origin comprises polylactic acid (PLA).

* * * * *